Jan. 7, 1964 G. K. WESSEL 3,117,282

MASER RECOVERY SYSTEM

Filed June 21, 1960 3 Sheets-Sheet 1

INVENTOR:
GUNTER K. WESSEL,
BY Richard V. Lang
HIS ATTORNEY

MASER RECOVERY SYSTEM

Filed June 21, 1960 3 Sheets-Sheet 2

INVENTOR:
GUNTER K. WESSEL,
BY Richard V. Lang
HIS ATTORNEY.

INVENTOR:
GUNTER K. WESSEL,
BY Richard V. Lang
HIS ATTORNEY.

United States Patent Office 3,117,282

Patented Jan. 7, 1964

3,117,282

MASER RECOVERY SYSTEM

Gunter K. Wessel, Syracuse, N.Y., assignor to General Electric Company, a corporation of New York Filed June 21, 1960, Ser. No. 37,624

18 Claims. (Cl. 325—485)

Figures 1, 2A:
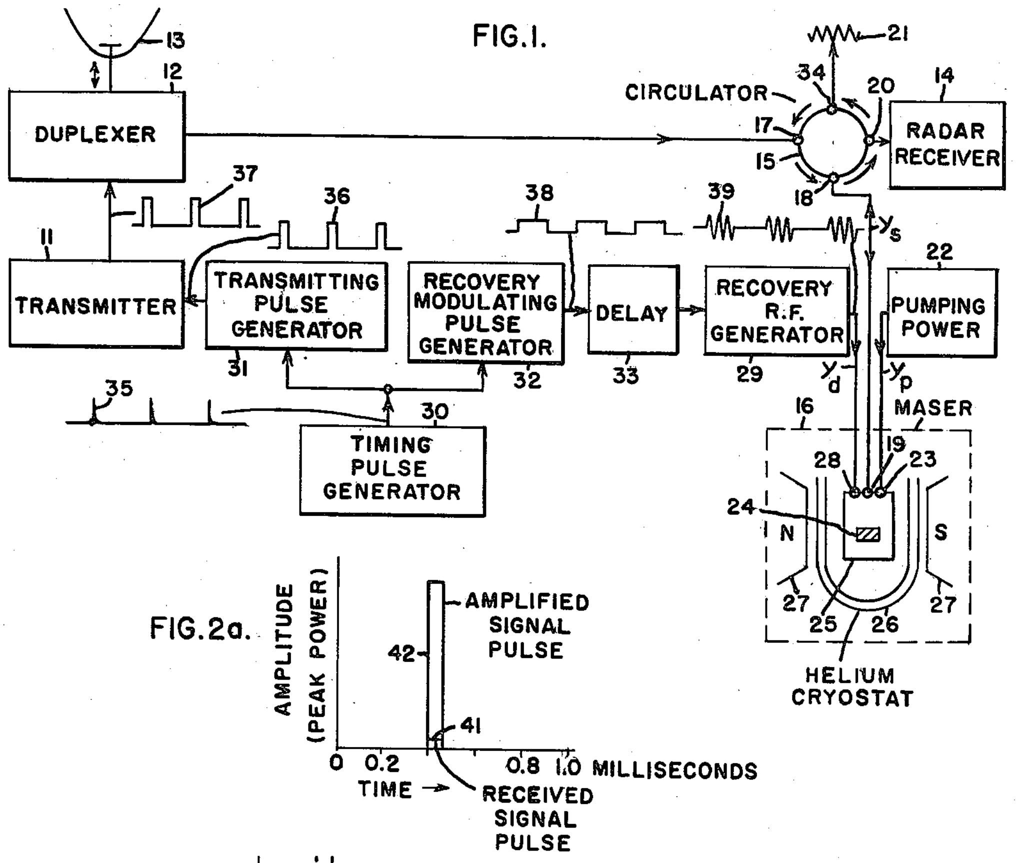

The present invention relates to a maser recovery system by which is meant apparatus associated with a maser, and including the same, whose purpose is to facilitate the recovery of the maser from a saturated condition.

As is well-known, solid state maser devices are devices providing for the amplification of high frequency signals by the utilization of stimulated emission. These devices are characterized by extremely low noise properties when utilized in the amplification of microwave energy. Conventionally these devices are utilized for amplifying radar signals as well as other high frequency waves having frequencies usually in excess of several hundred megacycles and usually less than 100 kilomegacycles. These devices are usually operated at low temperatures near absolute zero since certain of the requisite operating properties cannot be achieved except at low temperatures, and since low temperature operation tends to reduce the signal to noise level of the devices. Typical operating temperatures are those of liquid helium or liquid hydrogen.

In receiving installations, wherein high intensity received signals occasionally find their way into the maser, it has been found that the maser temporarily loses its ability to amplify. This condition is denoted "saturation." The signal levels at which this occurs vary greatly between materials used in the maser, but may often be on the level of 10 to 100 microwatts. The duration of the inoperative period, after the termination of a saturating strong signal is often several tens or hundreds of milliseconds. In many applications this period is so great as to greatly impair the usefulness of the maser amplifier. For instance, in radar installations, leakage from the transmitter is usually sufficiently high to cause saturation in the maser. Accordingly, if the transmitter is pulsed at a repetition rate in excess of the recovery rate the maser never recovers and is useless. The present invention seeks to avoid this problem by providing means by which the effect of transmitter leakage into the maser is neutralized after a very short period. In practice, the effect may be eliminated within a period on the order of 10 microseconds, a greater or lesser time being achievable dependent upon the needs of the system.

In addition to transmitter leakage, other sources such as strong signal returns or jamming signals can introduce into the maser signals of sufficient intensity to saturate the maser and prevent operation for a limited period. An object of the present invention is to provide means for eliminating this type of saturation also.

Accordingly, it is a general object of the present invention to provide novel apparatus for achieving rapid maser recovery as a result of saturation thereof.

It is a further object of the present invention to provide a novel arrangement for achieving rapid maser recovery in a radar system wherein saturating transmitter leakage to the receiving system is present.

It is still another object of the present invention to provide a novel arrangement for achieving rapid maser recovery in a receiving system wherein strong saturating signals at the maser operating frequency may be applied to the maser from other sources than a transmitter associated with a common antenna.

These and other objects of the invention are achieved in a novel arrangement incorporating a maser amplifier exhibiting four energy levels having at least three useful radiative transitions and having in combination therewith means for introducing signal frequency of frequency $f_s$, a pumping source of frequency $f_p$, and a recovery pulse of frequency $f_r$ arranged to provide a recovery pulse when the maser becomes saturated. The maser is arranged to be operated so that the pumping source has a frequency corresponding to the transition between the lowermost and third highest levels ($N_1$ and $N_3$) while the transition between the intermediate $N_2$ level and the $N_1$ level corresponds to the signal frequency, and the transition between the highest and lowest levels ($N_4$—$N_1$) corresponds to the frequency of the recovery pulse. Alternatively, pumping may occur between levels $N_3$ and $N_1$, while the signal transition is between levels $N_3$ and $N_2$ and the recovery pulse is between levels $N_4$ and $N_2$. The application of the recovery pulse in sufficient energy will bring about very rapid recovery of the maser.

In accordance with a more specific application of the invention, an embodiment is disclosed wherein a doped crystal is employed as the maser material for the purpose of achieving an initial splitting of energy levels in the doping material into two energy levels by the presence of internal electric fields of the crystal. When a magnetic field is simultaneously applied, four energy levels, having three highly probably transitions, are available for use in maser operation.

In accordance with one specific embodiment of the invention having application to a system wherein the transmitter and maser amplifier share a common antenna, means are provided for supplying a timed recovery pulse shortly after the termination of transmitter operation to the maser.

In accordance with another specific embodiment of the invention means are provided responsive to the presence of a high amplitude signal in the maser input circuit for generating a maser recovery pulse and thereby instituting rapid recovery thereof.

Figure 2B:
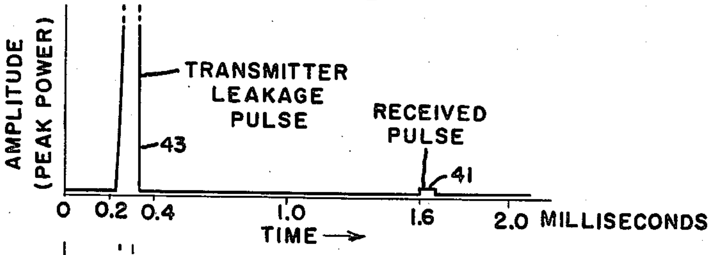
Figure 2C:
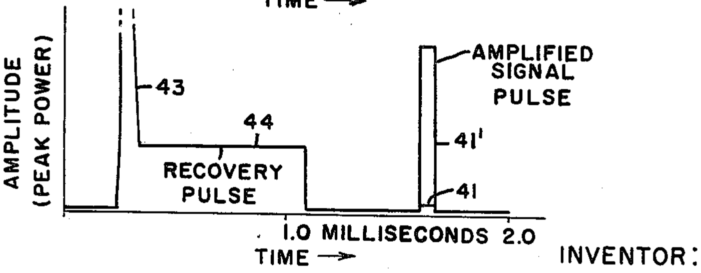
Figures 3A, 3B:
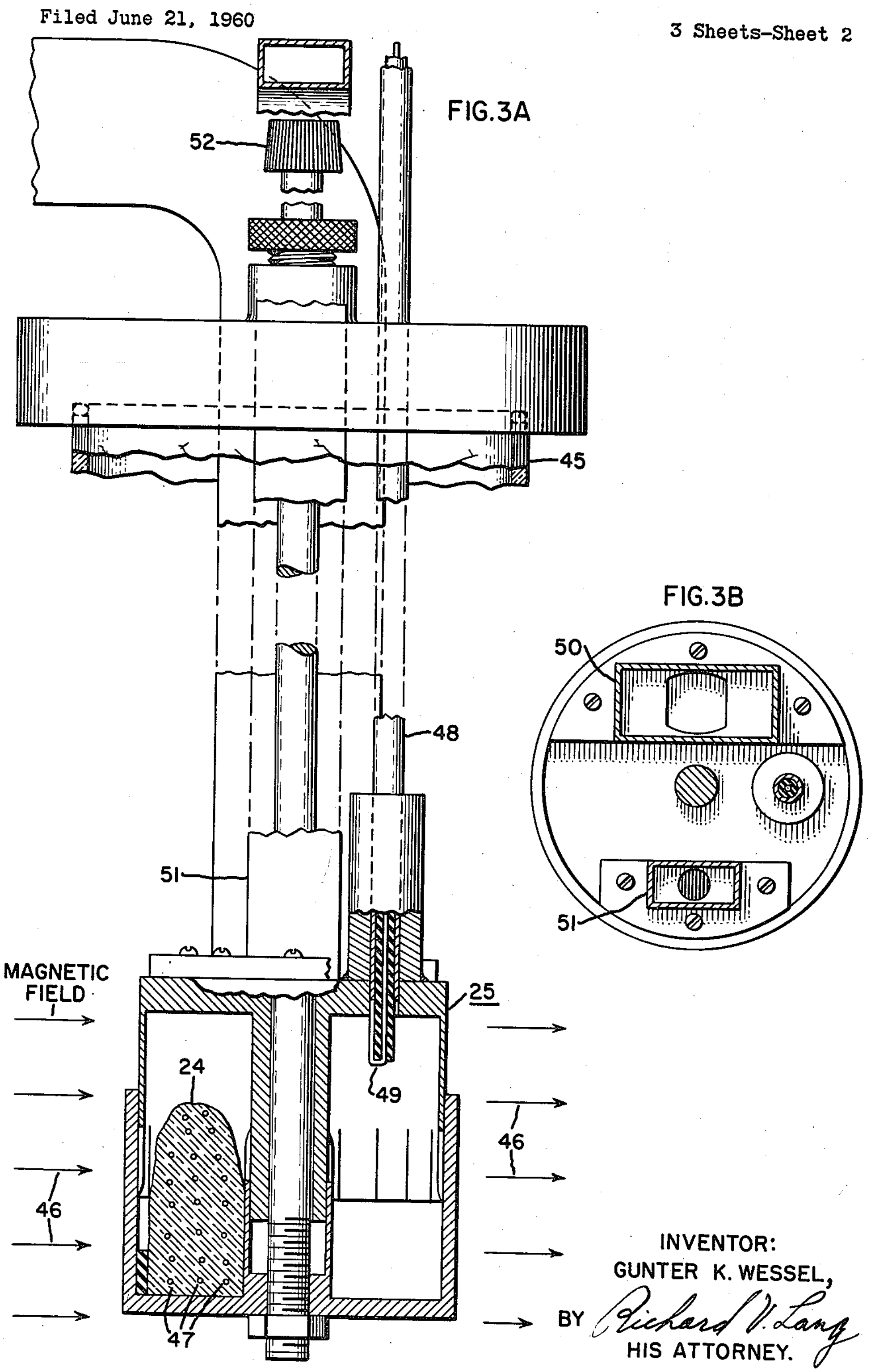
Figure 4:
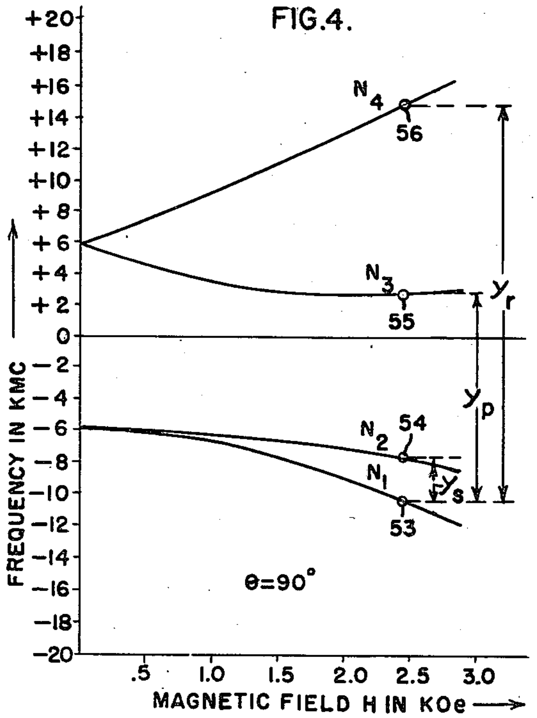
Figure 5:
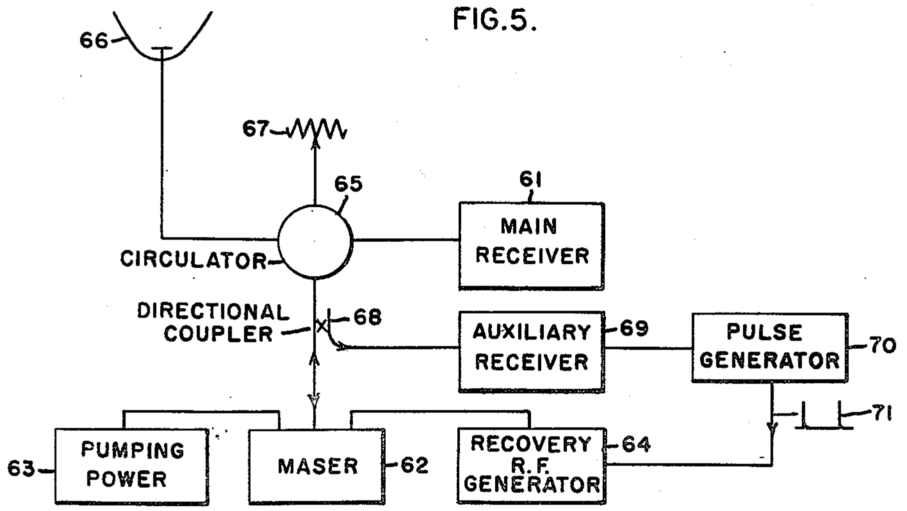

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

FIGURE 1 is a block diagram illustrating a first embodiment of the present invention;

FIGURES 2*a*, 2*b* and 2*c* are explanatory graphs illustrating the improvement achieved by use of the invention;

FIGURES 3*a* and 3*b* are illustrations of the mechanical details employed in a maser operating in accordance with the present invention;

FIGURE 4 is a graph employed in explaning the theoretical basis for operation of the invention; and FIGURE 5 is an illustration of a second embodiment of the invention arranged to provide automatic recovery of the maser upon the occurrence of any maser saturating signal.

Referring now to FIGURE 1 there is shown a block diagram representation of a radar system incorporating the invention. The radar system includes as its principal components a transmitter 11, a duplexer 12, a transmitting-receiving antenna 13, a radar receiver 14, a maser preamplifier 16 for the receiver 14, a circulator 15 for maser connection with the duplexer and the radar receiver, a pump 22 for maser operation, transmitter timing and pulsing elements 30 and 31 and the elements 29, 32 and 33 generally providing for maser recovery.

Duplex operation of the transmitter and receiver with the antenna occurs in the following manner. The transmitter 11 generates a series of pulses 37 of suitable power, wave shape and repetition rate for range determination, and supplies the same to one port of the duplexer 12 for ultimate application to the transmitting-receiving antenna 13. The receiving system, including the elements 14, 15 and 16 is coupled to another port of the duplexer 12. The duplexer 12 performs the usual function of coupling both the transmitter and receiver to a common antenna. When the transmitter is delivering power to the duplexer, the duplexer has the property of efficiently connecting the transmitter to the antenna for supplying substantially all transmitted power to the antenna while disconnecting the receiving system (14, 15 and 16) from the antenna. When the transmitter is quiescent, the duplexer provides an efficient connection between the antenna and receiver, feeding substantially all the received echo signal back to the receiver with a minimum of noise or dissipation. In the usual case, it is impractical to have both a low noise reception path through the duplexer between antenna and receiver and perfect freedom from transmitter leakage into the receiver. Accordingly, in selecting a duplexer permitting a high signal to noise ratio in reception, power leakage at the relatively high level of a few watts (peak power) must usually be tolerated. The leakage of such amounts of transmitted power into maser receiving system, while not permanently injuring the receiving system, has the undesirable effect of temporarily preventing amplification until the maser has "recovered." Suitable duplexers are of the gas discharge type. Applicant's novel solution to this problem caused by transmitter leakage will be discussed at length subsequently.

In reception, an echo of the transmitted pulse is received at the antenna 13, fed into the duplexer 12, thence to the circulator 15, which passes it to the maser 16 for amplification and thence, after amplification to the receiver 14. The circulator illustrated in FIGURE 1, is a four port microwave device having the property of delivering energy introduced into one port to the next counter-clockwise port. Thus the received signal delivered from duplexer 12 is introduced into the circulator at port 17 and is derived from the circulator at port 18 for application to the signal exchange port 19 of the maser preamplifier 16. After amplification in the maser 16, the signals reappear at the maser port 19 since the maser is a single port device utilizing the same port 19 for both signal introduction and signal derivation. The maser amplified signal energy available at port 19 then re-enters the circulator at the port 18 and is abstracted from the next counter-clockwise port 20 by the radar receiver 14 connected thereto. The receiver 14 includes additional amplifying means to produce an output signal of suitable amplitude for range determination or other purposes. A matched load 21 is coupled to circulator port 34.

The circulator 15 provides the foregoing unidirectional "circulation" largely unaffected by the driving impedances of power sources connected thereto. When a load device coupled to the circulator is not properly matched, some of the energy leaving the circulator will be reintroduced into the circulator because of the reflection occurring at the mismatch at the load device and passed to the next counter-clockwise port. The load 21 and receiver 14 are selected to "match" the characteristic impedances as closely as is practical to reduce undesired circulation to a minimum. The load 21 can be selected to provide rather precise matching and thus prevents any substantial amount of signal energy from passing all the way around the circulator and back into the maser to the detriment thereof.

The maser 16, for reasons to be explained, is a three frequency, four energy level device having in addition to the signal exchange port 19, a pump port 23 to which a pump 22 is connected, and a third port 28 finding use in the novel maser recovery provisions. The maser has as the active element thereof a paramagnetic body member 24 of ruby ($AL_2O_3$ doped with 0.04 percent of $Cr^{+++}$ composition) installed in the resonant cavity 25. Other materials having four or more available electronic energy levels may also be employed. The doping is selected at the indicated low percentage so as to insure isolation between the $Cr^{+++}$ ions and prevent spin coupling. The resonant cavity is resonant at three frequencies including the signal frequency-the lowest frequency, the pumping frequency-the intermediate frequency, and a third-and highest frequency used in achieving recovery.

The cavity 25 is designed to resonate at the signal frequency in a simple mode with higher order modes providing resonances at the pump frequency and at the third frequency used for recovery of the maser.

The resonant cavity is itself installed in a cryogenic system schematically illustrated at 26. It consists of a two stage cooling system employing heat convection and radiation barriers such as are provided by multiple Dewar flasks. The initial cooling may be provided by liquid nitrogen while the final cooling is by liquid helium preferably boiling at a reduced pressure. These provisions provide a maser operating temperature at from 2° to 4° Kelvin. The former temperature is preferred if the microwave components are directly immersed in the helium since it eliminates bubbling within the cavity below the surface of the helium which disturbs the tuning.

The maser member 24 and the resonant cavity 25 as seen in FIGURES 1 and 3*a* are placed in a magnetic field produced by adjustably positioned pole pieces 27, preferably oriented at approximately 90° with respect to the crystallographic axis of the ruby crystal. The magnetic field strength and direction are used to adjust the apparatus to the desired signal frequency since the energy of the transitions employed in maser amplification are dependent thereon. The electric field properties of the crystal also determine the energy of the transitions, as will be explained below. These properties are invariable in the completed crystal. At 2.5 kmc. a field strength of 2.5 koe. at a 90° orientation between the crystal axis and the magnetic field is required in ruby. In general, the maser efficiency and the transition frequencies are controlled by the selection of the angular orientation between magnetic field and crystallographic axis, and the magnetic field strength.

The elements 32, 33 and 29 taking part in maser recovery provide a recovery pulse of specified timing, specified energy content, and specified carrier frequency to the maser. When applied to the maser at input port 28, the recovery pulses produce in the maser substantially immediate recovery from the gain impairing effects of transmitter leakage.

The timing of the recovery pulses is sychronized with transmitter operation. The transmitter is itself timed by the source of timing pulses 30, producing an evenly spaced sequence of short duration synchronizing pulses 35, which are fed to the transmitting pulse generator 31. The transmitting pulse generator 31 generates a sequence of pulses 36 timed to begin with the timing pulses 35, and having the duration desired for the transmitter output waveform 37. The elements 30 and 31 are conventional in form and usually are components of the radar transmitter. For ease in explanation they have been separately shown.

Recovery pulse timing is also timed by the timing pulse generator 30. A recovery modulating pulse generator is shown at 32. It is coupled to the source 30 of timing pulses, and provides a rectangular pulse waveform 38 also synchronized to begin with the timing pulses 35 and having the waveform and duration desired at the output of the recovery network. The recovery modulating pulses 38 are then fed to a pulse delay element 33 coupled between the recovery modulating pulse generator 32 and a recovery R.F. generator 29. The period of the delay in element 33 (and the residual delay in the elements cascaded with it) is usually approximately equal to or slightly longer than the duration of the transmitted pulse. This is to delay the application of the pulse 38 to the recovery R.F. generator 29 until after the transmitting pulse 37 is terminated. The recovery R.F. generator 29 is coupled to maser recovery terminal 28 and is adapted to provide an output waveform 39 conforming in envelope to the waveform 38 supplied by recovery modulating pulse generator 32 and having a carrier at the required recovery frequency.

Applicant has discovered that when four level maser operation is provided for, that if the recovery pulse generator 32 has a frequency selected to excite the transition between the first and fourth electronic excitation level in the maser material and has a prescribed energy content, usually on the order of a few micro-watt-seconds, that the maser can be restored to full sensitivity after a loss of such sensitivity from transmitter leakage and that recovery can be achieved within the duration of the recovery pulse. Applicant has further discovered that recovery occurs practically instantly after the application of the required amount of energy in the recovery pulse, so that if the peak power is increased to rather substantial values, that the recovery can be made complete in such short times as from 10 to 100 microseconds or event less. As will be explained further below, the pulse repetition rate must usually not exceed 150 per second, depending upon the spin lattice relaxation times of the material selected.

A typical illustration of the effectiveness of the invention is illustrated in the graphs of FIGURES 2*a*, 2*b* and 2*c* wherein the vertical axes correspond to amplitude in peak power and the horizontal axes correspond to time. All of the waveforms are detected waveforms. In FIGURE 2*a*, a received pulse is shown at 41, prior to maser amplification, assuming the transmitter 11 quiescent or decoupled so as to avoid saturating effects. After maser amplification, the amplitude of the received pulse is considerably increased as seen at 42. Typical gains are around 30 decibels.

In FIGURE 2*b* the transmitter 11 is energized causing leakage of the pulse 43 into the maser at approximately 1.4 milliseconds prior to receipt of the signal. The received signal pulse 41 is not amplified in the maser, but remains at approximately the input level. The above illustrated effect of transmitter leakage in destroying maser action is well known. A transmitter leakage on the order of 10 to 100 microwatts will have this effect.

FIGURE 2*c* illustrates conditions wherein the harmful effect of transmitter leakage on destroying maser amplification is completely removed by application of the invention. As in FIGURE 2*b*, the transmitter pulse is shown at 43. Applicant's recovery pulse is shown at 44 commencing simultaneously with the termination of the transmitter pulse. The received pulse is shown at 41 with 41′ denoting the amplified input pulse. A visual comparison of 41 with 41′ indicates the typical effectiveness of the invention in restoring full amplification to the maser after the amplification has been temporarily destroyed by transmitter leakage. In FIGURES 2*a*, 2*b* the amplitudes of the transmitter leakage and recovery pulse waveforms have been distorted for ease in illustration as compared to the signal pulses. Usually, the received signal level is on the order of $10^{-10}$ watts peak power while the transmitter leakage pulses 43 and recovery pulses 44 are on the order of a $10^{-3}$ watts per peak power. Likewise, the relationship between input signal amplitude 41 and amplified signal 41′ amplitude are distorted. The unamplified signal 41 is too small to be illustrated in the scale suitable for showing the amplified signal 30 db (1000X) larger.

Prior to a theoretical explanation of the invention, let us further consider a practical embodiment of the invention, providing the corrective action illustrated in FIGURE 2*c* in a maser amplifying signal at approximately 2.50 kmc. in a radar system having a maximum pulse repetition rate of not exceeding 150 cycles per second.

The maser amplifier itself is shown in FIGURES 3*a* and 3*b* with the cryogenic environment, except for the Dewar flask fragmentarily shown at 45, and the magnetic members removed. Assuming the larger drawing dimension in FIGURE 3*a* to be the vertical dimension, the magnetic field is horizontal, and parallel to the plane of the paper as indicated by the arrows 46. FIGURE 3*b* is a section view taken just at the cavity surface. The maser member 24 having a generally cylindrical configuration is shown in the midst of the magnetic field 46 and oriented in the adjustable coaxial cavity 25 so that its crystallographic axis is horizontal and perpendicular to the magnetic field. The shape of the crystal is not critical, although it should be of substantial size so as to provide a large filling factor for the cavity. The ends of crystallographic axes emerging perpendicularly from the plane of the paper are illustrated by the circlets 47. The coaxial cavity 25 is dimensioned to sustain a TEM mode one half wavelength long at approximately 2.50 kilomegacycles. The maser material extends from the lower cavity surface where the magnetic lines of the signal are most intense to just past the center of the cavity where the field is least intense. Adjustment of the resonant frequency of the cavity is achieved by means of the tuning knob 52, which rotates the entire lower half of the cavity upon a threaded member, causing the lower member bearing the maser material 24 to be elevated. This reduces the vertical interior dimension of the cavity and elevates the resonance frequency of many of the modes sustained therein including, of course, the signal frequency. Eccentric placement of the maser material in the cavity makes the frequency adjustment as between various modes non-linear with angular orientation in rotation, a factor which simplifies tuning.

While the cavity 25 is designed primarily to resonate at the signal frequency, it also provides higher order modes for sustaining resonances at the higher frequency corresponding to an electronic transition in the maser material between levels $N_1$ and $N_3$ used for pumping, and at the highest frequency corresponding to a transition in the maser material between levels $N_1$ and $N_4$ used for achieving maser recovery. At the low temperatures of operation selected for maser operation, the resistive losses of the cavity are so greatly reduced that the cavity becomes moderately high "Q" with respect to all of its many modes. It accordingly produces useable resonances at frequent intervals at frequencies convenient for both pumping and recovery.

Since the entire cavity 25 is to be held at a greatly reduced temperature, it is essential that the electrical connections not introduce too much heat by way of conduction such as would prevent attainment of the desired operating temperature or cause localized boiling within the helium. In order to provide energization of the maser witout undesired heating, three rather elongated transmission lines are provided. These also may be used to support the cavity 25 in the cryogenic environment. The 2.50 kmc. signal (S band) is applied by means of the coaxial line 48 terminating in the rotatable coupling loop 49, while the pumping frequency (occurring at X band) is applied by means of the waveguide 50, and the desaturating pulse (occurring at K band) is applied by means of the smaller waveguide 51. The illustrated orientations and placement of the transmission elements 49, 50 and 51 are suitable for excitation of the desired modes in the cavity.

As indicated earlier the angular relationships between the R.F. fields and D.C. magnetic fields are important, though preferred orientations are readily found by adjustment. At the outset it is desirable for efficiency and signal frequency determination that the angle between the D.C. magnetic field and crystallographic axis in $Cr^{+++}$ doped ruby be initially selected near 90° for S band operation. This angle is determined by the transition probabilities and other angles will give preferred operation at different bands. The signal R.F. field on the other hand should generally have a substantial component perpendicular to the D.C. magnetic field. This last rule is not expressive of optimum adjustment at all magnetic fields, however, since the transitions corresponding to exchanges between levels $N_1$ and $N_2$ are not purely Zeeman type transitions until extremely high D.C. magnetic field levels. At the lower magnetic field levels selected for operation here the Stark effect produced by internal crystalline electric fields is pronounced.

The orientation productive of effective coupling between pump and maser material for coupling to a transition between levels $N_1$ and $N_3$ occurs when the R.F. field and D.C. magnetic field have substantial mutually parallel components. Since the higher modes in the cavity 25 are small with respect to the physical size of the maser body member 24, they exist in substantially all orientations within the material and provide adequate coupling without requiring specific adjustment.

Similarly, the orientation productive of effective coupling between the recovery waves and the maser material for coupling to a transition between levels $N_1$ and $N_4$ occurs when the R.F. pumping field and D.C. magnetic field have substantial mutually perpendicular components. Since the higher order modes exist in all orientations within the material, adequate coupling is also provided without specific adjustment.

The foregoing system will operate at all only when the applied signal, pump and recovery pulse carrier frequencies correspond to the frequencies of three transitions in the maser material. It will operate efficiently when these input frequencies correspond to three resonance frequencies in the microwave structure coupling the energy to the maser member.

The adjustment of the system to meet these requirements is achieved in the following manner. A magnetic operating point is selected to provide maser amplification at a predetermined signal frequency, for example at 2.50 kmc., and the corresponding transitional frequencies are determined, assuming a magnetic field orientation of 90°. FIGURE 4 illustrates the relationship between magnetic field at 90° orientation and the frequencies of $Cr^{+++}$ doped ruby corresponding to each of the electronic energy levels $N_1$, $N_2$, $N_3$ and $N_4$ finding application in the invention. It may be seen that the lower plot labeled $N_1$ exhibits a decreasing characteristic frequency as one increases the magnetic field toward 3000 oersteds, as does the next above plot labeled $N_2$, and the uppermost plot $N_4$. The plot $N_3$ on the other hand falls rather sharply initially until the field reaches approximately 2 koe. and then increases gradually. While the graph does not clearly illustrate this point, four distinct levels occur at very low D.C. magnetic fields. Assuming then that 2.50 kmc. is the desired signal frequency, one examines the graph to determine the point at which the vertical distance between level $N_1$ and $N_2$ corresponds to that frequency. The points 53 and 54 for the $N_1$—$N_2$ transition corresponding to a D.C. magnetic field of 2.50 koe. satisfy this condition. This D.C. magnetic field then produces a corresponding $N_3$—$N_1$ transition between the points 55 and 53 corresponding to approximately 12.6 kmc. and a $N_4$—$N_1$ transition between the points 56 and 53 corresponding to 23.8 kmc. The transition $N_3$—$N_1$ is selected for the pump frequency and the transition $N_4$—$N_1$ is selected for the recovery pulse frequency.

Having made the foregoing approximate determination of the pump and recovery frequencies, one then tunes the cavity to bring simultaneous resonances at the signal and pumping frequencies. Several degrees of freedom, assuring rather precise tuning are provided by the adjustment of the vertical dimension of the cavity, by the adjustment of the magnetic field strength which changes the relative difference between the signal and pump frequencies, and the angle between the magnetic field and the maser material. A further adjustment which introduces additional ease in attaining a final overall adjustment is the fact that the maser material is asymmetrically placed in the cavity, a factor tending to provide sinusoidal perturbations in the frequency separation between the pump and signal frequencies for each rotation of the lower portion of the cavity. These adjustments thus provide a very simple way and very convenient way for tuning the cavity rather precisely to the signal and pump frequencies.

The adjustment of the cavity to provide efficient coupling of the recovery pulse waveform may be achieved by turning off the pump 22 and using the recovery R.F. generator 29 as the pump instead. In order to avoid disturbing the previous settings, one may then adjust the recovery frequency until it coincides with the last transition. If high efficiency is not immediately achieved, one may go through the original tuning steps, this time selecting perhaps a slightly different angle of magnetic field, until the system works efficiently with either the pump 22 providing pumping action or the source of recovery waves providing the pumping energy. In actual practice, the adjustments are very easily achieved because of the very close spacing, usually on the order of 100 to 200 megacycles of the resonances of the cavity for the recovery frequency.

At this point an explanataion of the underlying principles of operation of the invention is to be undertaken. As is well-known, maser operation is achieved by "stimulated emission." The quantum concept explanation of the conventional maser is premised upon a recognition of three distinct energy levels in the atoms taking part in maser operation. These levels, $N_1$, $N_2$ and $N_3$ (assigned subscripts in order of increasing energy) must be of a nature such that radiative transitions between both the levels $N_2$ and $N_1$ and between the levels $N_3$ and $N_1$ are probable. A transition from $N_3$ to $N_2$ is also required but it need not be radiative. In the conventional maser, the difference in energy between intermediate level $N_2$ and $N_1$ (or $N_3$) corresponds to the signal frequency while the difference in enrgy between levels $N_3$ and $N_1$ corresponds to the pumping frequency. In the unexcited state the levels $N_1$, $N_2$ and $N_3$ are populated by successively smaller numbers of atoms. The relative distribution between the levels is in accordance with the exponential law of Boltzmann equating the population to the temperature energy and transition energy. In the presence of the pump whose frequency is equal to that corresponding to a transition between levels $N_3$ and $N_1$, a large number of atoms are caused to enter the $N_3$ level. If the pumping power is substantial, the population at the $N_3$ level approaches the population in level $N_1$, thereby resulting in a rather substantial reduction in the normal ratio of atoms in level $N_1$ with respect to those in level $N_2$. Under favorable conditions of the involved relaxation times and the relative positions of energy levels to each other, an over supply of atoms in the $N_2$ state occurs with regard to the atoms in the $N_1$ state. This ratio should differ by several percentage points from equality between $N_1$ and $N_2$, $N_2$ being the larger, for effective operation. If now a signal of low amplitude is introduced into the system (tuned to the frequency corresponding to the transition from level $N_2$ to $N_1$) it will be observed that the signal will stimulate an emission of energy greater than the amount of applied signal energy. This occurs because the probability for stimulated emission in any given atom is equal to the probability for absorption of energy for that atom. If, however, the relative densities of atoms at one level exceed that at the other level, then the level with the greater density will experience the greater rate of depletion. If the upper level is made more dense by the pumping action, then the net effect of the application of the signal is stimulated emission.

Masers have the problem of becoming saturated when a high intensity signal is applied. Saturation is the situation when the two levels associated with the signal transition become equally populated, thus making the "up" transition equally probable to the "down" transition. This condition prohibits a net increase in power to an applied signal. In radar systems, this amplification preventing event often occurs as a result of leakage power from the transmitter into the maser receiver. Since saturation can occur at peak powers of 10 to 100 microwatts in ruby (for example) strong signal returns can also bring about this effect.

The present invention has provided a method of solving the saturation problem by direct redistribution of the population densities. The introduction into the maser of a recovery pulse depletes the lower signal transition level with respect to the upper signal transition level by transferring atoms to the $N_4$ level. The desaturation or recovery pulse is thus selected to be of a frequency corresponding to the transition from $N_1$ to $N_4$, and should be of sufficient energy to bring the levels $N_4$ and $N_1$ into near mutual saturation. As explained with respect to the description of the ordinary maser, the occurrence of a recovery pulse depletes the level $N_1$ thus making it relatively less populated than the level $N_2$, thus restoring maser operation. It should be observed that the creation of saturation between levels $N_1$ and $N_4$ requires appreciable energy. Recovery can be hastened if one increases the peak power level of the recovery pulse. The peak power level selected will determine whether recovery can be achieved within 1 microsecond or 10 microseconds or 100 microseconds. If a recovery on the order of 10 microseconds is required, the peak power level of the recovery pulse need not exceed several milliwatts (in ruby, for example).

In order that the operation of the present illustrative embodiment be more clearly understood, one may observe that the four levels achieved in the present embodiment arise from the fine structure of the active ion. This fine structure arises from electron spins and is present in paramagnetic ions. Four levels occur in such ions having an inner quantum number (J) or 3/2 or over in the presence of an electric and magnetic field. In the absence of the magnetic field two or more levels are produced. The electric field effect is usually denominated the "Stark effect" and is often visually recognizable as a splitting of the spectral lines. The magnetic field effect is also usually recognizable by a splitting of the spectral lines and is denominated the Zeeman effect. In order that high efficiency operation result, it is desirable that hyperfine structure be at a minimum. The hyperfine structure is usually a coupling of the magnetic moment of the nucleus with the electron spin moment, and is not equally present in all materials.

In the present embodiment, operation is had of the ions in a region where both Stark and Zeeman effects are present. As illustrated in FIGURE 4, at zero magnetic fields two distinct energy levels exit. This arises from the Stark effect and is attributable to the spatially repetitive electric field in the crystal lattice in which the active ions are placed. The material should be selected such that the Stark effect splitting is substantial with respect to the desired signal frequency. The presence of the Stark effect tends to make the transitions between $N_4$ and $N_1$, and $N_3$ and $N_1$ more probable. If one would now use FIGURE 4 one sees that after the magnetic field is applied, that additional splitting occurs in the two original levels. This additional splitting is a result of the Zeeman effect. At extremely high field levels, well to the right of the chart of FIGURE 5, the energy levels would correspond to primarily Zeeman effect properties. When this condition exists, the rules governing possible energy transitions tend to forbid any other than adjacent transitions. Accordingly, the $N_3$—$N_1$ and $N_4$—$N_1$ transitions are no longer favored. Accordingly, applicant has selected a region for operation wherein both the Stark and the Zeeman effects are pronounced so that the transitions corresponding to level $N_4$ to $N_1$, $N_3$ to $N_1$ are highly probable so as to provide efficient energy coupling. It may thus be that the initial Stark effect splitting is selected to be substantial when compared to the splitting produced by the magnetic field at signal frequency. This provides a rough measure of the amount of Stark effect splitting which is necessary to permit efficient utilization of the four levels.

In order to provide recovery on the occurrence of recovery pulses subsequent to the first, there must be sufficient time left for the $N_4$ level to clear, so as to accept new atoms from level $N_1$. In the materials described, this time is typically 6 milliseconds. This period determines the maximum pulse repetition rate at which recovery may be achieved.

Operation at low absolute temperatures is mandatory. This arises in part because the spin lattice relaxation times decrease rapidly with temperature. In order that a given population density difference be maintained between levels for achieving amplification, it is required that the pump pump faster as the temperature is elevated. The undesirable effect of increases in pumping power is to heat up the maser, and thus regeneratively increase the demands for more energy from the pump to the point where they cannot be satisfied.

A second factor requiring low temperature operation is that at elevated temperatures the natural relative distributions between levels are so nearly equal that it becomes very difficult to achieve sufficiently high differences in populations for amplification. These considerations dictate operation at reduced temperatures, usually at least equal to that of liquid hydrogen or helium, and preferably lower.

The invention may also be employed in an arrangement illustrated in FIG. 5 wherein it is desired to protect a receiver system from high level saturating signals arriving at the antenna. This signal may be a jamming signal supplied by another transmitter, or occasionally an unusually high intensity signal return. The anti-jamming network is seen to comprise a main receiver 61 coupled through the circulator, a maser preamplifier 62 provided with a pump 63 and a desaturation pulse generator 64, a circulator 65, and an antenna 66. The circulator 65 is additionally provided with a matched load 67. The system additionally includes a directional coupler 68, an auxiliary jamming detection receiver 69, and a pulse generator 70.

The foregoing anti-jamming system works in the following fashion. The maser 62 provides preamplification for the principal receiver 61, the circulator 65 providing segregation between the input and output of the S band maser in the same manner as described earlier with respect to the embodiment of FIGURE 1. The pump 63 is likewise arranged to provide for normal maser amplification. The elements 68, 69, 70 and 64 provide for the recovery of the maser after reception of a pulse of sufficient intensity to insensitize the maser 62. The foregoing parts are connected together in the foregoing fashion. The directional coupler 68 is coupled in the signal path between the circulator 65 and the maser 62 and provides for the connection of energy from the antenna to the auxiliary receiver 69. The receiver 69 is adapted to provide in its output a control voltage whenever a received pulse is present exceeding the threshold required to insensitize the maser. The control voltage is then applied to a pulse generator 70 which produces a short duration pulse timed to occur at the moment that the jamming pulse has terminated, or as closely thereafter as is practical. The sharp spike output waveform of the pulse generator 70 is illustrated at 71. It is then applied to a recovery modulator 64 which produces a recovery pulse in the maser in the general manner explained with respect to the first embodiment.

In view of the rapid recovery of the foregoing system, one may very effectively employ the invention to the suppression of jamming signals of either a fixed periodic or randomly spaced interval.

While rather specific embodiments of the invention have been resorted to, it should be apparent that many techniques other than those disclosed with respect to these embodiments may be utilized to secure four level maser operation and thus achieve recovery as herein taught. It is of course essential that the four levels be such as to permit three probable radiative transitions. While the application has treated primarily an arrangement wherein all three radiative transitions are to a common lowest level, the invention may be used in a situation wherein the signal transition is between intermediate levels such as levels $N_3$ and $N_2$. In that event, the pump will operate between the levels $N_3$ and $N_1$ while the recovery source should operate between levels $N_4$ and $N_2$.

There are two other arrangements which may be made with respect to the use of the various energy levels. One may use the upper level $N_4$ as common to all transitions. In this case levels $N_4$ and $N_3$ correspond to the signal transition, $N_4$ and $N_2$ correspond to the pump transition, and $N_4$ and $N_1$ to the recovery transition. The fourth arrangement is one wherein the levels $N_4$ and $N_3$ correspond to a signal transition; the levels $N_4$ and $N_2$ correspond to the pump transition, and the levels $N_2$ and $N_1$ correspond to the recovery transition. These four arrangements have certain detailed operating differences in the nature of energy separations (i.e. frequency), spin relaxation times, etc. which provide greater flexibility in application than that possessed by any one arrangement alone.

In the second type of operation, the pump and recovery frequency must be made manually different (as was true in the principal case wherein the lowermost level is common to all used radiative transitions). If the pump and recovery frequencies are made identical, then the pump itself will tend to cause saturation between the pump levels as well as the recovery levels. If a strong signal occurs, tending to equalize one pump level to one recovery level, then equalitiy between all four levels occurs and saturation results.

The materials which have been employed are furthermore exemplary of a rather wide choice that may be made, although they have outstanding properties for the purposes herein sought.

Accordingly, while particular embodiments of the invention have been shown and described, it should be understood that the invention is not limited thereto, and it is intended in the appended claims to claim all such variations as fall in the true spirit of the present invention.

What I claim as new and desire to secure by Letters Patent of the United States is:

1. In combination, a maser device having an active member, circuit means associated with said active member for coupling thereto signals of frequency ($f_s$), a pumping source of frequency ($f_p$) and a recovery pulse source of frequency ($f_r$), said active member taking the form of a doped crystal, said crystal doping being of ions sufficiently distant from one another in the crystal lattice to prevent substantial coupling, said ions being characterized by an inner magnetic quantum number (J) of at least 3/2 permitting at least four energy levels descriptive of the fine structure without creating in the presence of a magnetic field substantial hyperfine structure, said crystal being selected such that the spatially repetitive electric field provided therein causes a separation of the energy levels absent a magnetic field by an energy which is substantial with respect to the energy corresponding to a transition of signal frequency, means for applying a magnetic field to said active member whose strength and direction is selected to induce additional substantial splitting of the energy levels to create four energy levels exhibiting three sufficiently probable transitions for useful energy coupling, one of said transitions corresponding to the signal frequency ($f_s$); one of said transitions corresponding to the pump frequency ($f_p$); and one of said transitions corresponding to recovery frequency ($f_r$), said signals of frequency ($f_s$) at times containing waves of sufficient strength to saturate the levels corresponding to said signal transition and means actuated in timed relation to said saturating waves for selectively introducing pulses into said maser of frequency ($f_r$) when desired to unsaturate the maser with respect to the levels used in the signal transition.

2. The combination set forth in claim 1 wherein the transition corresponding to the signal frequency ($f_s$) is that between levels $N_2$ and $N_1$; wherein the transition corresponding to the pumping frequency ($f_p$) is that between levels $N_3$ and $N_1$; and wherein the transition corresponding to the recovery frequency ($f_r$) is that between levels $N_4$ and $N_1$, the subscripts being assigned in order of increasing energy levels.

3. The combination set forth in claim 1 wherein the transition corresponding to the signal frequency ($f_s$) is that between levels $N_3$ and $N_2$; wherein the transition corresponding to the pumping frequency ($f_p$) is that between levels $N_3$ and $N_1$; and wherein the transition corresponding to the recovery frequency ($f_r$) is that between levels $N_4$ and $N_2$, the subscripts being assigned in order of increasing energy levels.

4. The combination set forth in claim 1 wherein the transition corresponding to the signal frequency ($f_s$) is that between levels $N_4$ and $N_3$; wherein the transition corresponding to the pumping frequency ($f_p$) is that between levels $N_4$ and $N_2$; and wherein the transition corresponding to the recovery frequency ($f_r$) is that between levels $N_4$ and $N_1$, the subscripts being assigned in order of increasing energy levels.

5. The combination set forth in claim 1 wherein the transition corresponding to the signal frequency ($f_s$) is that between levels $N_4$ and $N_3$; wherein the transition corresponding to the pumping frequency ($f_p$) is that between levels $N_4$ and $N_2$; and wherein the transition corresponding to the recovery frequency ($f_r$) is that between levels $N_2$ and $N_1$, the subscripts being assigned in order of increasing energy levels.

6. In combination, a maser device having an active member, a source of signals of frequency ($f_s$), a source of pumping waves of frequency ($f_p$), a source of recovery pulses of frequency ($f_r$), circuit means associated with said active member for coupling thereto said waves from said three sources, said active member being arranged to have four energy levels exhibiting three sufficiently probable transitions for useful energy coupling, pairs of said levels defining radiative transitions corresponding respectively to the signal frequency ($f_s$), to the pumping frequency ($f_p$) and to the recovery frequency ($f_r$) said signals of frequency ($f_s$) at times containing waves of sufficient strength to saturate the levels corresponding to said signal transition, and means actuated in timed relation to said saturating waves for selectively introducing pulses from said recovery source into said maser of frequency ($f_r$) when desired to unsaturate the maser with respect to the signal levels.

7. The combination set forth in claim 6 wherein the transition corresponding to the signal frequency ($f_s$) is that between levels $N_2$ and $N_1$; wherein the transition corresponding to the pumping frequency ($f_p$) is that between levels $N_3$ and $N_1$; and wherein the transition corresponding to the recovery frequency ($f_r$) is that between levels $N_4$ and $N_1$, the subscripts being assigned in order of increasing energy levels.

8. The combination set forth in claim 6 wherein the transition corresponding to the signal frequency ($f_s$) is that between levels $N_3$ and $N_2$; wherein the transition corresponding to the pumping frequency ($f_p$) is that between levels $N_3$ and $N_1$; and wherein the transition corresponding to the recovery frequency ($f_r$) is that between levels $N_4$ and $N_2$, the subscripts being assigned in order of increasing energy levels.

9. The combination set forth in claim 6 wherein the transition corresponding to the signal frequency ($f_s$) is that between levels $N_4$ and $N_3$; wherein the transition corresponding to the pumping frequency ($f_p$) is that between levels $N_4$ and $N_2$; and wherein the transition corresponding to the recovery frequency ($f_r$) is that between levels $N_4$ and $N_1$, the subscripts being assigned in order of increasing energy levels.

10. The combination set forth in claim 6 wherein the transition corresponding to the signal frequency ($f_s$) is that between levels $N_4$ and $N_3$; wherein the transition corresponding to the pumping frequency ($f_p$) is that between levels $N_4$ and $N_2$; and wherein the transition corresponding to the recovery frequency ($f_r$) is that between levels $N_2$ and $N_1$, the subscripts being assigned in order of increasing energy levels.

11. The combination set forth in claim 6 wherein said means for selectively introducing recovery pulses comprises means for sensing the presence of a signal of sufficient intensity to saturate the maser device and to initiate operation of said recovery pulse source.

12. The combination set forth in claim 6 wherein said means for selectively introducing recovery pulses comprises an auxiliary receiver coupled by means of a directional coupler to receive the signals supplied to the maser signal input, said auxiliary receiver being arranged to produce an output when signals applied to its input exceed the saturating level of said maser device, and means for supplying said auxiliary receiver output to said source of recovery pulses for operation thereof.

13. The combination set forth in claim 6 wherein said maser is operated in duplex with a pulsed transmitter from a common antenna, and wherein said means for selectively introducing recovery pulses comprises means for deriving a modulating pulse timed to begin at the termination of the transmitter pulse and means for supplying said modulating pulse to said recovery pulse source for modulation and timing thereof.

14. The combination set forth in claim 13 wherein said recovery pulse source produces a pulse of sufficient intensity and duration to produce substantial equality in atom densities between the corresponding transition levels.

15. The combination set forth in claim 6 wherein said active member is ruby.

16. The combination set forth in claim 6 wherein said active member is a doped crystalline substance, the doping ingredient being characterized by an inner magnetic quantum member (J) of at least 3/2, so as to permit four distinct levels in the fine structure, said host crystal having a repetitive electric field so as to cause a substantial splitting of the levels absent a magnetic field, said combination having in addition means for applying a magnetic field to cause a further substantial splitting of the levels to said four distinct levels and thus provide three probable radiative transitions for efficient coupling to waves of frequencies $f_s$, $f_p$ and $f_r$ respectively.

17. The combination set forth in claim 16 wherein said active member is operated at liquid helium temperatures below a temperature where the liquid helium becomes a super fluid and bubbles will not form.

18. The combination set forth in claim 16 wherein said tuned circuit is an axially extensible coaxial tank operating in a low order TEM mode at signal frequency, and higher order modes at the pumping and recovery frequencies, and wherein said active member is asymmetrically mounted in said cavity and rotationally movable with respect to the ports for connection of said sources to produce a rotational variation in tuning the cavity, and thus flexibility in tuning the cavity to all three applied frequencies.

References Cited in the file of this patent

UNITED STATES PATENTS

| | | |
|---|---|---|
| 2,909,654 | Bloembergen | Oct. 20, 1959 |
| 2,997,581 | Bolef et al. | Aug. 22, 1961 |

OTHER REFERENCES

Ingram: "The Application of Magnetic Resonance to Solid State Electronics," Journal British IRE, June 1959, pp. 357–367.

Forward et al.: "Application of Solid-State Ruby Maser to X B and Radar System," 1959 IRE Wescon Convention Record, Part I, pages 119 to 125.